Oct. 17, 1933.   W. J. BROWN   1,930,505
APPARATUS FOR HIGH FREQUENCY ELECTRIC SIGNALING
Filed July 11, 1928   2 Sheets-Sheet 1
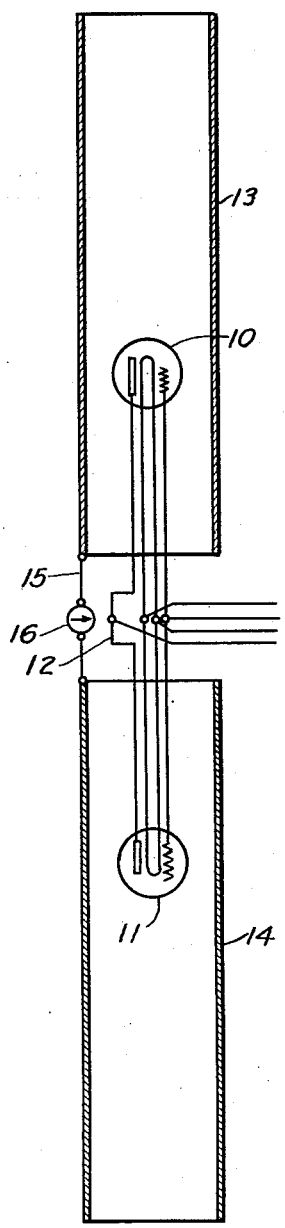
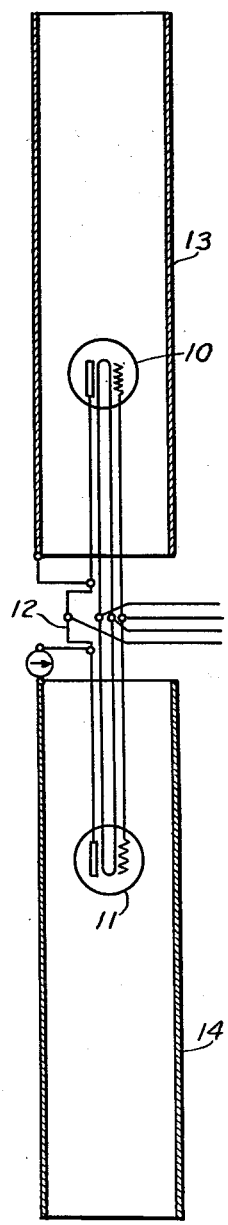
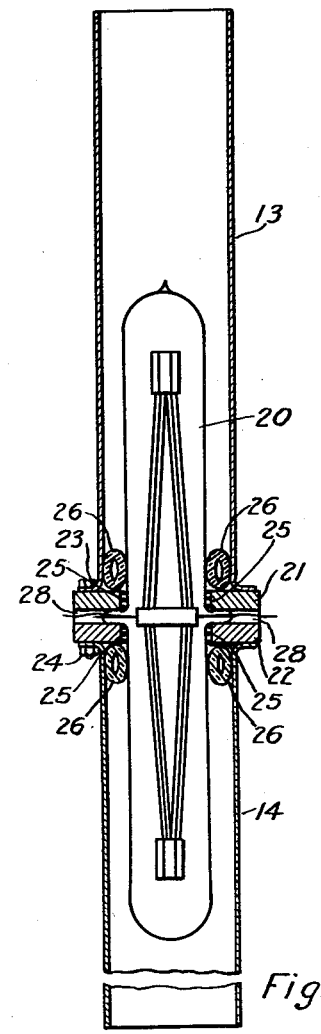
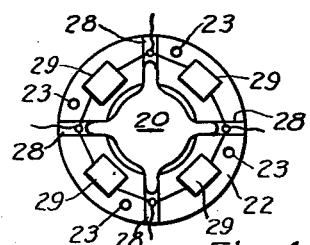
Fig. 1.   Fig. 2.   Fig. 3.
Fig. 4.
INVENTOR
Walter J. Brown
BY
ATTORNEY

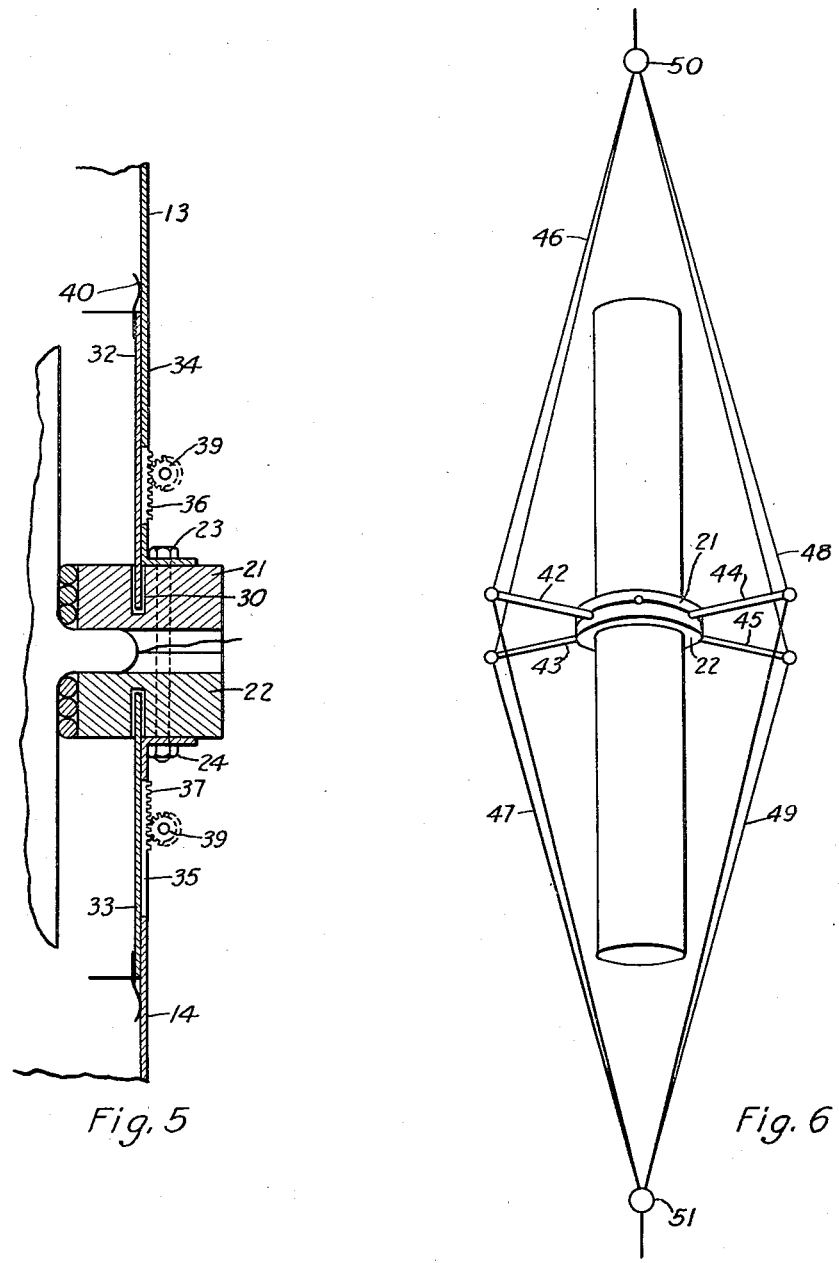

Patented Oct. 17, 1933

1,930,505

UNITED STATES PATENT OFFICE 1,930,505

APPARATUS FOR HIGH FREQUENCY ELECTRIC SIGNALING

Walter John Brown, Brooklands, England, assignor to Associated Electrical Industries Limited, a company of Great Britain Application July 11, 1928, Serial No. 291,976, and in Great Britain July 12, 1927

3 Claims. (Cl. 250—33)

This invention relates to apparatus for high frequency electric signaling.

According to the invention an apparatus for high frequency electric signaling comprises a generator of high frequency electrical oscillations enclosed within or embraced by an electrical screen or cage, which screen or cage constitutes a means of radiating the high frequency energy to the surrounding space.

The oscillation generator may be of the type wherein two multiple electrode vacuum electric discharge devices, spaced apart, have their corresponding electrodes connected together by substantially straight parallel conductors and may conveniently take the particular form described with reference to Figs. 1 and 2 of Patent 1,750,386, granted March 11, 1930. The invention, however, is not limited to the generators described in this patent. The screen or cage may comprise a tube, not necessarily of circular cross-section, consisting of electrically conducting material, enclosing the generator and of length somewhat greater than that of the generator. The tube may be divided across a plane perpendicular to its axis at or near the centre thereof. The two sections may be coupled to a high frequency oscillatory circuit of the generator, for example, by conductive connections to points thereon or by capacity thereto.

A measuring instrument may be included between the two sections for indicating the high frequency current flowing therein.

In addition to its main function of serving as a radiator of high frequency energy the screen or cage may conveniently be constructed and arranged to provide mechanical protection for the generator. It may also be of elliptical or streamline section for use in exposed situations such as in aircraft.

The invention is illustrated by way of example in the accompanying drawings in which Fig. 1 is a diagram illustrating one embodiment of the invention and Fig. 2 is a diagram illustrating a similar embodiment of the invention utilizing a different manner of electrically coupling the generator of high frequency electrical oscillations to the enclosing screen or cage. Fig. 3 is a vertical section, partly diagrammatic, through a preferred form of apparatus and Fig. 4 is a plan view of the apparatus shown in Fig. 3 with the top half of the electrical screen or cage removed. Fig. 5 is a part vertical section illustrating a modification of the structure shown in Figs. 3 and 4 whereby the degree of electrical coupling between the generator of high frequency electrical oscillations and the electrical screen or cage can be varied and Fig. 6 is a partly diagrammatic view illustrating the manner of mounting the apparatus.

Referring now to Fig. 1 the generator of high frequency electrical oscillations comprises two thermionic valves 10 and 11 which are spaced apart and of which the corresponding electrodes are connected together by substantially rectilinear conductors. The conductor connecting the anodes of the valves 10 and 11 together is, however, electrically lengthened by a bent portion 12. Connections are made to the centres of the conductors which connect the electrodes of the valves 10 and 11 for the supply of energy to and determining the mean potential of these electrodes in known manner. Condensers may be also connected to the centres of the conductors connecting the electrodes of the valves 10 and 11 in known manner.

The system formed by the valves 10 and 11 generates electrical oscillations at a very high frequency which is largely determined by the distance between the valves 10 and 11. The valves 10 and 11 are enclosed within or embraced by an electrical screen or cage formed by two hollow electrically conducting cylinders 13 and 14 arranged coaxially and spaced apart from one another. The conducting cylinders 13 and 14 are of necessity open at their adjacent ends, but may be either closed or open at their remote ends. The conducting cylinders 13 and 14 are connected together by a conductor 15 which may include an ammeter 16 suitable for measuring alternating currents of very high frequency.

It is found that when the generator of high frequency electrical oscillations comprising the valves 10 and 11 is in operation high frequency electrical currents are induced in the electrical screen or cage formed by the conducting cylinders 13 and 14 and conductor 15. The coupling between the generator of high frequency electrical oscillations and the electrical screen or cage appears to depend, to a large extent, upon the space between the adjacent ends of the conducting cylinders 13 and 14.

In a particular embodiment of the apparatus which has been constructed the distance between the outer ends of the anodes of the valves 10 and 11 was approximately 42 cms. Oscillations were generated at a wave length of approximately 2.2 meters. The conducting cylinders 13 and 14 were each 50 cms. in length. The maximum reading on the ammeter 16 was obtained when the adjacent ends of the conducting cylinders were spaced apart by a distance of about 1 cm. In these circumstances the generator of high frequency oscillations operated in a normal mode and it was found that there was substantial radiation of high frequency energy from the apparatus.

When however, the distance between the conducting cylinders 13 and 14 was decreased below 1 cm. the intensity of current recorded by the ammeter 16 diminished. When the distance between the conducting cylinders 13 and 14 was decreased to about 0.15 cms. the intensity of current through the ammeter 16 suddenly decreased to practically zero and the radiation of high frequency energy from the system appeared to be small. On the other hand it was confirmed that the generator of high frequency oscillations was still generating oscillations but in a different mode from the normal mode referred to above.

In another experiment four conductors, such as 15, were symmetrically spaced around the conducting cylinders 13 and 14 and the ammeter 16 was included in one of them. It appeared that the coupling between the generator of high frequency electrical oscillations and the electrical screen or cage was substantially different when four conductors such as 15 were used. It was now found that the maximum reading of the ammeter 16 occurred when the conducting cylinders 13 and 14 were spaced about 10 cms. apart. The oscillation generator was in these circumstances, however, generating oscillations in the second mode above referred to. It appeared, however, that the intensity of radiation of high frequency electrical energy was considerably less when the oscillation generator was working in the second mode.

It would appear that when only one connecting wire, such as 15, is employed a certain amount of magnetic coupling exists between the oscillation generator and the electrical screen or cage but that when four symmetrically disposed wires such as 15 are used the magnetic coupling is substantially eliminated.

In the arrangement illustrated in Fig. 2 the looped portion 12 of the conductors which connect the anodes of the valves 10 and 11 together is included in the connection between the conducting cylinders 13 and 14 so that the electrical screen or cage formed by the conducting cylinders 13 and 14 is conductively coupled to the anode circuit of the generator of high frequency electrical oscillations. This arrangement has been found to work satisfactorily.

In Figs. 3 and 4 a practical embodiment of the invention is illustrated employing the kind of oscillation generator illustrated in Figs. 1 and 2 of Patent 1,750,386. The oscillation generator indicated generally by the reference 20 is held between two rings 21 and 22 of insulating material. The two rings 21 and 22 of insulating material are slipped over the two ends of the oscillation generator and are clamped together by bolts 23 and nuts 24. Insulating soft packing 25, such as rubber tube, is inserted between the rings 21 and 22 and the glass envelope of the oscillation generator 20 to secure adequate support thereof without danger of mechanical damage. Flanged conducting tubes 13 and 14 are affixed to the rings 21 and 22 respectively by means of the bolts 23 and nuts 24. Insulating packing 26 is inserted between the conducting cylinders 13 and 14 and the glass envelope of the oscillation generator 20. Slots 28 are formed in the rings 21 and 22 to accommodate the seals and connections for supply leads of the oscillation generator 20. Condensers 29 are connected between adjacent supply leads of the oscillation generators and are disposed in recesses formed in the rings 21 and 22. The electrical connection between the conducting cylinders 13 and 14 is effected by the bolts 23 and the distance between the adjacent ends of the conducting cylinders 13 and 14 is fixed by the thickness of the rings 21 and 22, which is so determined that the requisite degree of coupling between the electrical screen or cage and the oscillation generator 20 is secured.

Alternatively the bolts 23 and nuts 24 may be arranged so as to afford no electrical connection between the flanges of tubes 13, 14, for instance by cutting away portions of said flanges around alternate bolt-holes. The adjacent ends of tubes 13, 14 may then be connected together by a single lead which may conveniently include a high frequency ammeter, as shown in Fig. 1.

In Fig. 5 a modified construction is illustrated in which the coupling between the oscillation generator 20 and the electrical screen or cage can be varied. The rings 21 and 22 are provided with annular slots 30 and 31 respectively. Slidable conducting tubes 32 and 33 are fitted to engage the slots 30 and 31 and to slide within the conducting cylinders 13 and 14. Slots 34 and 35 are provided in the conducting cylinders 13 and 14 and racks 36 and 37 secured to the slidable tubes 32 and 33 project through these slots. Pinions 38 and 39 are journalled in bearings mounted upon the conducting cylinders 13 and 14 respectively and engage the racks. Leaf springs 40 and 41 are attached to the outer ends of the slidable tubes 32 and 33 and engage the conducting cylinders 13 and 14 respectively to make good electrical contact therewith.

By rotation of the pinions 38 and 39 the distance between adjacent ends of the tubes 32 and 33 may be readily varied and thus the coupling between the oscillation generator 20 and the electrical screen or cage formed by the conducting cylinders 13 and 14 and the tubes 32 and 33 may be adjusted.

Fig. 6 illustrates the manner of supporting the apparatus described from a mast, yard or other support. Four rods 42, 43, 44 and 45 are symmetrically attached to the rings 21 and 22 and project radially therefrom. Ropes 46, 47, 48 and 49 are attached to eyes in the outer ends of the rods 42, 43, 44 and 45 respectively, and are joined together to rings 50 and 51. Halyards may be attached to the rings 50 and 51 whereby the whole apparatus may be hoisted to a mast head or to a yard.

The ropes 46, 47, 48 and 49 are also spaced away from the electrical screen or cage so that the electrical losses in the ropes are small; moreover the only insulating support is attached to the apparatus and a potential node thereon, consequently there will be no material high frequency electrical loss due to the attachment of the supports.

It will be appreciated that the above description is given by way of example only and that many modifications may be made without departing from the scope of the invention.

I claim as my invention:—

1. Apparatus comprising a generator of high frequency electrical oscillations enclosed within an electrically conducting cage or screen and electrically coupled thereto, said cage consisting of two portions, and means for adjusting the distance between said portions.

2. Apparatus comprising a generator of high-frequency electrical oscillations enclosed within two electrically-conducting tubes and electrically connected thereto, said tubes being positioned with their ends adjacent to each other, and means for adjusting the distance between said ends.

3. Apparatus comprising a generator of high-frequency electrical oscillations enclosed within two electrically-conducting tubes or cages and electrically coupled therewith, said generator consisting of at least two vacuum tubes having substantially parallel conductors extending between the grids and anodes thereof, one vacuum tube being positioned within one of said conducting tubes and the other vacuum tube being positioned within the other of said connecting tubes.

WALTER JOHN BROWN.